US012731383B2

(12) United States Patent
Narain

(10) Patent No.: US 12,731,383 B2
(45) Date of Patent: Sep. 8, 2026

(54) INTERACTIVE SYSTEM AND METHOD FOR IMPROVED COLLECTION AND ANNOTATION OF MACHINE LEARNING DATASETS

(71) Applicant: Profformance Technologies Private Limited, Gurugram (IN)

(72) Inventor: Sahil Narain, Gurgaon (IN)

(73) Assignee: Profformance Technologies Private Limited, Gurugram (IN)

( * ) Notice: Subject to any disclaimer, the term of this patent is extended or adjusted under 35 U.S.C. 154(b) by 0 days.

(21) Appl. No.: 19/390,524

(22) Filed: Nov. 15, 2025

(65) Prior Publication Data

US 2026/0141692 A1 May 21, 2026

(30) Foreign Application Priority Data

Nov. 15, 2024 (IN) ............................ 202411088444

(51) Int. Cl.
*G06V 10/774* (2022.01)

(52) U.S. Cl.
CPC .................................. *G06V 10/774* (2022.01)

(58) Field of Classification Search
CPC .................................................... G06V 10/774
See application file for complete search history.

(56) References Cited

U.S. PATENT DOCUMENTS 10,574,881 B2 * 2/2020 Oleson ................. H04N 23/632
10,860,836 B1 * 12/2020 Tyagi .................. G06V 10/454
11,539,848 B2 * 12/2022 Roach ................ G06Q 20/3276
11,978,273 B1 * 5/2024 Ramaswamy ....... G06V 30/412
2025/0378703 A1 * 12/2025 Cha ....................... G06V 20/70

OTHER PUBLICATIONS

Ao, Bochao, and Bingbing Fan. "Overview of the development of AI dataset annotation." 2022 2nd International Symposium on Artificial Intelligence and its Application on Media (ISAIAM). IEEE, 2022. (Year: 2022).*

* cited by examiner

*Primary Examiner* — Stephen R Koziol
*Assistant Examiner* — Joshua Chen
(74) *Attorney, Agent, or Firm* — RC Trademark Company

(57) ABSTRACT

A method for improved collection and annotation of training datasets for training machine learning models is described. An image is captured using an image capture device and established as a reference image frame. The object of interest in the reference frame is annotated using a geometrical shape and established as seed data along with a pre-defined quantity target. The dimension of the annotated object is scaled to establish an annotation guideline. The annotation guideline is shifted in position in subsequent live images and displayed along with a live image of the object of interest. The user is prompted to adjust the live image so that the object of interest is fully encompassed by annotation guideline and capture a second live image. The captured image is classified in real time as accepted based on a benchmarking threshold and stored. The process is repeated until the pre-defined quantity target is satisfied.

18 Claims, 6 Drawing Sheets

INTERACTIVE SYSTEM AND METHOD FOR IMPROVED COLLECTION AND ANNOTATION OF MACHINE LEARNING DATASETS

TECHNICAL FIELD

The present disclosure relates to the field of curation of training datasets and more specifically, to a guided interactive system and method for improved collection and annotation of datasets used for training machine learning models. Further, the disclosure relates to improving the efficiency of the data collection process and subsequently for improving the quality of machine learning (ML) models. The datasets comprise audio, video, textual and image data.

BACKGROUND

In today's digital age, with the advent of Artificial Intelligence (AI) and Machine Learning (ML) technologies, there has been a growing need to train and develop ML models of high quality and accuracy, especially for commercial applications. A large amount of training data is required to train ML models to produce accurate results. The more the spread of various features available in the training dataset, the better the ML model is adapted to learn the variations in data in real world scenarios to produce high quality results. Taking the example of image datasets, a large quantity of images is acquired using an image capture device, like the dashcam of an automobile or a smartphone camera. The images so collected are then annotated manually with information that a ML model requires for learning. For detection of objects in images, annotations are made by drawing a bounding box to mark an area or objects of interest in an image. During training, several annotated images are presented to the ML model to teach it the features of an image in the context of the area or objects of interest. At run time, the ML model then determines and identifies areas or objects of interest on its own, on images it has never seen before. The conventional technique followed industry-wide involves collecting visual data to cover various scenarios for each of the regions/objects that are required for training machine learning models. Once visual data is collected, it is analyzed using several statistical and manual methodologies by typically sampling the dataset in batches. Depending on a pre-defined benchmarking criteria (or any other pre-set conditions), a fraction of the image data that qualifies the benchmarking conditions is accepted, while the remaining data is rejected. Accepted images are distributed for annotation to multiple experts, who then annotate the data. Collation of annotated data and subsequent analysis is done manually, before aggregating the accepted annotated data to a final dataset which is used for training the ML model. Popular tools that conform to this workflow are Label Studio (https://labelstud.io/), Make Sense (https://www.makesense.ai/), and LabelMe http://labelme.csail.mit.edu/Release3.0/), amongst several other online tools used for annotating images.

The conventional technique for creating the training dataset requires significant manual effort, involving the collection of thousands of training images with variations in the environment; followed by selection of qualifying images, and manual annotation for building a training dataset. The overall process is time consuming, and is a costly exercise prone to human errors. In practice, it imposes a limitation on the number of training data points that can be realistically provided to train a ML model. This directly impacts the quality of the trained ML model and significantly affects the accuracy of the ML model output.

Furthermore, there are other external factors that are required to be incorporated during the collection of the training dataset, such as environmental conditions in the case of image-based data collection. The images clicked under varying conditions of ambient lighting, reflections, background artifacts, distance between camera and object, incidental angles between the camera and the object being clicked, etc. contribute significantly to the quality of image data collection and further annotation for training purposes. Further manual verification of the subjective quality of visual data, which includes checking for factors like improper framing, motion blur, low light noise, etc. not only increases the time, but also creates outliers that reduce the quality of the machine learning model. Further, when it comes to annotation and data collection for textual data, different tones, active/passive voice queries, jargon, phrases, local slang and colloquial phrasing, need to be taken into account to ensure a high quality of data for training a ML model. A ML model's output accuracy is as good as the training data provided to the ML model to learn variations and predict accurate outputs in real world scenarios. Thus, it becomes imperative for providing superior quality inputs encompassing various scenarios for building an efficient ML model.

Therefore, in light of the foregoing discussion, there exists a need to overcome the aforementioned drawbacks associated with conventional systems and methods for collection and annotation of datasets used for training machine learning models.

SUMMARY

The present disclosure provides a system and a method for improved collection and annotation of datasets used for training machine learning models. The present disclosure provides a solution to the existing problem of efficient and accurate curation of training datasets comprising images and text, by guiding the collection and annotation of the dataset in an interactive manner. An objective of the present disclosure is to provide a solution that overcomes, at least partially, the problems encountered in the prior art and to provide an improved system and an improved method for collection and annotation of datasets used to train a machine learning model.

One or more objectives of the present disclosure are achieved by the solutions provided in the enclosed independent claims. Advantageous implementations of the present disclosure are further defined in the dependent claims.

In one aspect, the system comprises a hardware device comprising storage devices, processing units and network interface. Further, the system comprises one or more image capture devices. The hardware device and one or more image capture devices communicate between each other via a communication network. The processing unit is capable of executing instructions for guiding the annotation of the image datapoints acquired using the image capture device in an interactive manner, by prompting the user with expected guidelines. The annotated images are then stored in the storage unit for further analysis and for training machine learning models.

In another aspect of the disclosure, the system comprises an image capture device comprising processing and storage units and capable of collecting and storing image datapoints. The processing unit is further capable of executing instructions for guiding the annotation of the image datapoints in an interactive manner, by prompting the user with expected guidelines. Further, the annotated images are stored in the storage unit associated with the image capture device. A communication interface of the image capture device enables the communication of data between the image capture device and external networks. In an embodiment of the disclosure, a method for improving collection and annotation of image datasets to train a machine learning model is described. An image capture device is used to capture a reference image frame comprising an object of interest and obtaining a reference datapoint for a label or a set of labels associated with the object of interest from the reference image frame. The reference data point is annotated to obtain an expected annotation comprising a geometrical shape for each label or the set of labels. A seed data is then established using a pre-defined quantity target and the expected annotation The geometrical shape is scaled based on a predetermined scaling factor and an annotation guideline is obtained. The two dimensional position of the annotation guideline is shifted by varying the position in a two-dimensional coordinate system and the shifted annotation guideline along with a live image on the screen of the image capture device is displayed. The live image comprises the object of interest. Subsequently, a user is prompted to adjust the live image containing the object of interest such that the shifted annotation guideline fully encompasses the object of interest displayed on the live image screen and a second live image frame is captured. This object of interest in the second live image frame and the object of interest in the reference frame are then compared to determine a similarity score. If the similarity score is above a pre-defined threshold, the captured second live image frame is classified as accepted. The accepted images are stored in a storage unit for training a machine learning model. The steps of shifting, prompting, capturing, classifying and storing are repeated until the pre-defined quantity target criteria is satisfied.

In an alternative embodiment of the disclosure, the method for improving collection and annotation of textual datasets to train machine learning models is described. A reference textual dataset pertaining to a textual object of interest is obtained. The reference textual dataset is associated with a pre-defined textual quantity target. The reference textual dataset comprises questions/phrases pertaining to an object of interest represented, in one manner by masking/attention words. The masking/attention words acts as representative for a sentence or group of words associated with a label or a set of labels. In general, the masking/attention words act as a representation for the remaining words by picking the relevance between the group of words in a phrase. In other words, these masking/attention words are used to understand the context of the reference textual datapoint. Further, a user is guided/prompted to associate grammatical variations of the questions/phrases of the reference textual data with the reference textual dataset, based on the masking/attention words to determine a textual similarity score. The grammatical variations are active/passive voice variations and/or contextual variations. If the similarity score is below a second pre-defined threshold, the grammatical variations of questions/phrases are classified in real-time as accepted and stored in a similar storage unit as the training dataset for training a machine learning model. Further, the steps of guiding, classifying and storing are repeated until the pre-defined textual quantity target criteria is satisfied.

In an embodiment of the disclosure, it is an object of the invention to provide an objective and subjective improvement in data collection and annotation of training data used in the machine learning training workflow typically followed by the industry. It is an object of the invention to ensure that the data collected through the improved manner is training-ready, without the need for manual intervention. It is a further object of the invention to provide a major improvement in the data collection, cleansing and the annotation process involved in training machine learning models. It is an object of the invention to reduce the time taken in building a training data set thereby reducing the overall time from idea to implementation of a niche machine learning model.

The method achieves all the advantages and technical effects of the system of the present disclosure. It will be appreciated that features of the present disclosure are susceptible to being combined in various combinations without departing from the scope of the present disclosure as defined by the appended claims. Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers. Embodiments of the present disclosure will now be described, by way of example only, with reference to the following diagrams wherein.

DETAILED DESCRIPTION OF EMBODIMENTS

Figure 1:
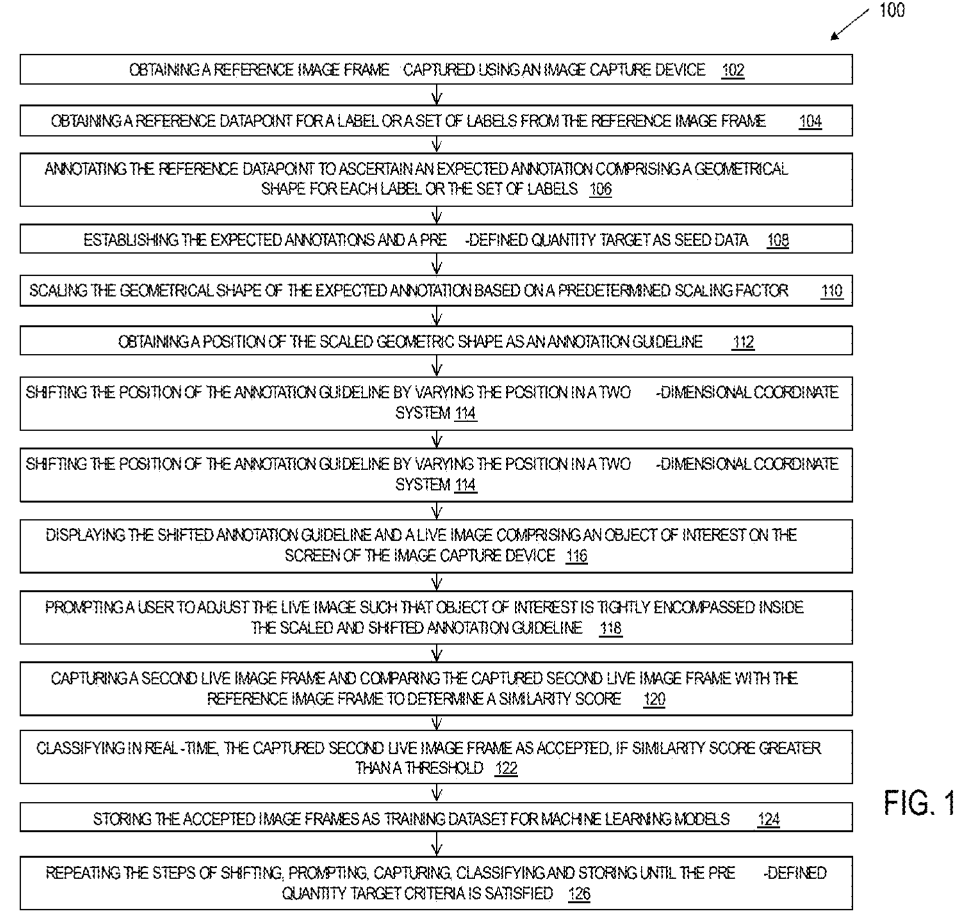
FIG. 1 is a flowchart of a method for curation of image data by collecting and annotating the image data for building a repository of training dataset used to train machine learning models, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. FIG. 1 is a flowchart of a method for curation of image data by collecting and annotating image data for building a repository of training data, referred to as the "training dataset", used to train machine learning models, in accordance with an embodiment of the present disclosure. It should be noted that, FIG. 1 is described using image data as a training dataset, whereas any type of training dataset can be used like textual, video or audio dataset. The flowchart for a method for curation of textual dataset is described in detail with reference to FIG. 2. In FIG. 1, shown is a method 100 for curation of image data by collecting and annotating the image data for building a repository of training dataset used to train machine learning models that includes steps 102 to 126.

At step 102, the method includes capturing an image frame as a reference image frame using an image capture device. The reference image is used as seed data for benchmarking purposes and comprises an area of interest from one or more objects, captured in the reference image frame. Once the reference image is captured accurately, at step 104, reference datapoints are determined for a label or a set of labels. The labels or the set of labels is associated with an area of interest from one or more objects captured in the reference frame. In an exemplary association, the label or set of labels can be associated with a car, like a steering wheel, a brake assembly, a disc drum, a dashboard etc. Each of these labels individually can then become associated as an object of interest from the one or more objects captured in the reference image frame. Next, at step 106, the reference datapoint is annotated for each of the label or set of labels to ascertain an expected annotation. Expected annotation acts as a guiding or interacting mechanism that is used by the method to help acquire further training dataset for training the ML model. In the case of an image frame, the expected annotation takes the form of a geometrical shape comprising a rectangular bounding box, a square bounding box or a higher dimension polygonal bounding box. Further at step 108, the expected annotation and a pre-defined quantity data is established as a seed data that is used in collection of training dataset for a certain type of ML model. The pre-defined quantity data is a number of accepted data points needed for training a certain type of ML model with an accuracy above a certain limit, say 80% to 95% +%. This is determined based on a functional association between number of classes/labels and number of input data required per class/label. It is generally believed that the more the number of classes/labels, the higher the chance of overlap of input data between them, so the more the number of data points needed per class/label to offset the effect of overlapping data. In an exemplary scenario, assuming there are 100 classes, then for text-based classification, 200 phrases can be set as the quantity target, per class/label for achieving an accuracy of at least 90%. In the case of image classification, 1500 images per class and 1000 images per class for image object detection can be set as pre-defined quantities for achieving a similar accuracy.

At step 110, the geometrical shape of the expected annotation is scaled using a scaling factor. A scaling engine (not shown) is used to scale the rectangular or square or higher dimensional geometrical shape bounding box for example, using a scaling factor The scaling engine would then scale, by changing the horizontal and vertical dimension of the bounding box by the set scaling factor. The original dimension of the bounding box is then scaled by using a scaling factor from the reference image to 0.7 to 1.3 times the dimension of the original bounding box, assuming the scaling factor is set to 0.3. Further, a margin is also set (for example to 0.1) which roughly translates to a top, left, bottom and right margin of 5%. At step 112, the scaled bounding box of the geometric shape is obtained as an annotation guideline. This annotation guideline, which is approximately 90% of usable area in the center of the scaled dimension of the original bounding box is where a user would likely be guided to focus the object of interest associated with a label to capture a training image pertaining to that label/class.

After the expected annotation has been obtained, at step 114, the expected annotation is shifted by varying its position in a two-dimensional coordinate system. It should be noted that, varying the position of the annotation guideline is done such that, some or all of the portion of the shifted annotation guideline perimeter falls within the boundary of the current view of the camera lens of the image capture device. At step 116, the method refreshes the screen of the image capture device to display a live image that contains the object of interest based on the current angle and focus of the camera of the image capture device with reference to the object of interest. Further, the live image also contains some or all portion of the shifted position of the annotation guideline. At step 118, a user is prompted to adjust the position of the frame such that the annotation guideline tightly completely encompasses the object of interest. The prompting can be performed by various means, for example, when the annotation guideline completely encompasses the object of interest, a textual or visual prompt can be provided on the display screen informing the user that an image can be captured. Exemplary visual prompting can be done from highlighting the object of interest, or by highlighting a button/interface that is generally used to capture an image on the image capture device. It should be noted that it is well known in the art that prompting can be provided in other ways than those provided in the above examples and such prompting techniques can be used by the method without deviating from the spirit and scope of the invention.

At step 120, based on the prompting provided in the display of the image capture device, a user captures a second live image frame. The second live image frame contains the object of interest encompassed by the annotation guideline. The object of interest from the second live image frame is then compared with the object of interest from the reference image frame and a similarity score is determined. This step is also known as benchmarking of the second live image frame. Once the second live image frame is captured, the object of interest is checked for similarity with the reference image frame, where the object of interest comprises the entire image frame in the case of training a model for image classification. In the cases involving object detection, the object of interest in the second live image frame encompassed by the bounding box is provided to a detection engine (not shown) that runs a series of checks. The detection engine runs well known techniques used in blur detection, noise/grain detection and improper framing by calculating the similarity between the reference image frame and the second live image frame. It should be noted that thresholds used to detect the amount of blur, noise/grain and framing issues can vary depending on the system and the environment in which the images are being captured. A default value is set as threshold for each of the blur, noise/grain and framing comparison, for example a default value for blur detection can be set to high, unless otherwise configured to fine tune for a specific use case. Further, for noise/grain detection default value can be set to a midway value, unless otherwise configured to fine tune for the specific use case. It should be noted that, the default value is configurable to be set depending on a specific use case, and can be set to a high, medium or low value depending on the other factors such as environmental factors, like images acquired in a moving vehicle as compared to a stationary vehicle/reference, images acquired in bright sunshine, images acquired on a rainy day etc.

At step 122, the similarity score that is calculated in the above step is compared with a pre-defined threshold value. The pre-defined threshold value is obtained based on various factors as discussed above like the environment factor and the type of ML problem (object detection or image classification, etc.). The second live image frame is then classified in real-time as accepted if the similarity score is greater than the pre-defined threshold value. Once the second live image frame is accepted, the pre-defined quantity target contribution value is then incremented. At step 124, the accepted second live image frame is stored in a storage medium as the training dataset for training a ML model. At step 126, the method steps 114 to 124 are repeated in an iterative manner until the pre-defined quantity target criteria is reached, i.e. the number of frames required per class/label as training dataset for training a ML model. As described earlier, the pre-defined quantity target is dependent on the number of classes/labels.

Further, the geometrical shape comprises, a rectangular bounding box, a square bounding box or a higher dimension polygonal bounding box, the reference image frame comprises one or more objects, wherein each of the one or more objects is associated with a label from the set of labels, wherein the pre-defined quantity target is a threshold number of captured image frame classified as accepted for each of the label or the set of labels, wherein predetermined scaling factor is a value by which the size of the geometrical shape of the expected annotation is scaled-up and/or scaled-down to obtain the size of the annotation guideline, wherein shifting the position of annotation guideline comprises changing the two-dimensional co-ordinates of the annotation guideline using a shifting formula, wherein prompting the user comprises providing a visual or textual indication, wherein prompting the user further comprises checking for motion or blur, improper framing of the live image screen, wherein similarity score is determined based on one or more of a blur detection, a noise detection, an improper framing detection and environmental conditions, wherein classifying in real-time the captured images comprises comparing the similarity score of the captured images to one or more of a benchmark criteria, wherein the benchmark criteria is associated with a threshold value for each of the class/label, wherein comparing the captured second live image frame further comprises comparing the object of interest in the reference frame and captured second live image frame and wherein the training dataset comprises audio dataset, image dataset, video dataset and/or textual dataset.

Figure 2:
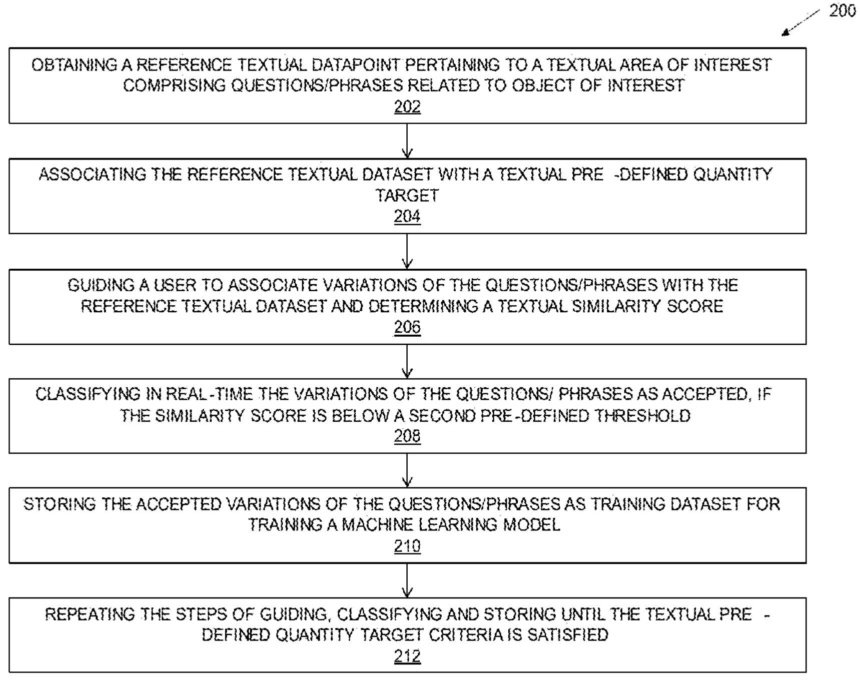
FIG. 2 is a flowchart of a method for curation of textual data by collecting and annotating the textual data for building a repository of training dataset used to train machine learning models, in accordance with an embodiment of the present disclosure.

FIG. 2 is a flowchart of a method for curation of textual data by collecting and annotating the textual data for building a repository of training dataset used to train machine learning models, in accordance with an embodiment of the present disclosure. With reference to FIG. 2, there is shown a method 200 for curation of image data by collecting and annotating the textual data for building a repository of training dataset used to train machine learning models that includes steps 202 to 212.

At step 202, the method includes obtaining a reference textual dataset. The reference textual dataset comprises questions or phrases related to an object of interest. The object of interest in text-based systems refers to attention/asking words that are generally used to indicate the part of the sentence which holds representative significance to a particular label/class. These attention/masking words act like a contextual indicator for a word or group of words which is then used as data to train the ML model. A ML model could then utilize these trained attention/masking words to identify in real-time the context of the question or phrase input to the model and analyze them further to achieve the desired goal of the model. At step 204, a pre-defined textual quantity target is associated with the reference textual dataset. As described earlier in the context of image dataset, textual pre-defined quantity target is a number of accepted data points needed for training a certain type of ML model with an accuracy above a certain limit, say 80 % to 95 % +. This is determined based on a functional association between number of classes/labels and number of input data required per class/label. It is generally believed that the more the number of classes/labels, the higher the chance of overlap of input data between them, so the more the number of data points needed per class/label to offset the effect of overlapping data. In an exemplary scenario, assuming there are 100 classes, then for text-based classification, 200 phrases can be set as the quantity target, per class/label for achieving an accuracy of at least 90%.

At step 206, the method guides/prompts a user to associate variations of the questions or phrases derived pertaining to an object of interest to the reference textual dataset and a textual similarity score is determined. The variations of the questions/phrases pertaining to an object of interest could be any variations that grammatically alter the text without altering the meaning of the questions/phrases. For e.g. the variations might comprise grammatical variations, active/passive voice variations, contextual variations, different tones, jargon, phrases and/or certain specific local lingua (Indian, Irish, British, American etc.). Further, guiding/prompting a user comprises the method asking the user to associate the question of the reference textual dataset with variations in an active voice or a specific lingua. For example, if the original reference textual dataset question pertaining to class/label is "How is the brake pedal used", then the system might prompt the user to associate its variation in voice. Assuming the user associates "How to use the brake pedal", this phrase/text is then run through a detection engine to determine a similarity score. As a further example of prompting/guiding the user with a different tone, assuming the user associated "Braking to stop the car", this phrase/text is also run through a detection engine to determine a similarity score. It should be noted that there are a lot of different tones in the English language like narrative, cynical, informative, critical etc. and any or all of these variations might be used by a user to associate variations pertaining to questions/phrases involving an object of interest, in other works attention/masking words. Further, it is to be noted that this methodology is not limited to the English language and is valid for any given language. The similarity score is determined based on the association/selection of variations of phrases with the reference textual dataset in a detection engine. At step 208, the method employs the detection engine to evaluate the selected/associated variation of the phrases for a degree of overlap with reference textual dataset question and classify in real-time the variations of the phrases as accepted or rejected based on comparing the similarity score with a textual threshold or a second pre-defined threshold. If the overlap is above the textual threshold or second pre-defined threshold, then it signifies that the variation in question is likely going to be less significant in the contribution towards the trained model and so it is rejected. The user is guided/prompted with further variations to select/associate them to the reference textual dataset question. Further the method can guide/prompt a user to associate other aspects where an entity would need to know about the object of interest (e.g. brake pedal). It should be noted that textual threshold can be set to a high, medium or low value depending on the context and the class/label associated with the object of interest. In the example above, a high value for the threshold can be set initially, which means if the degree of overlap is high, then the variation question might be less useful in contributing as a training dataset and hence highly likely to be rejected as a training dataset. At step 210, the method stores the accepted variations in phrases in the training dataset for training the ML model. Further, at step 212, the steps 206-210 of guiding, classifying and storing of variations of phrases of the reference textual dataset is repeated in an iterative manner until the textual pre-defined quantity target criteria is satisfied, i.e. the number of textual phrases required per class/label as training dataset for training a ML model. As described earlier, the pre-defined quantity target is dependent on the number of classes/labels.

Figures 3A, 3B:
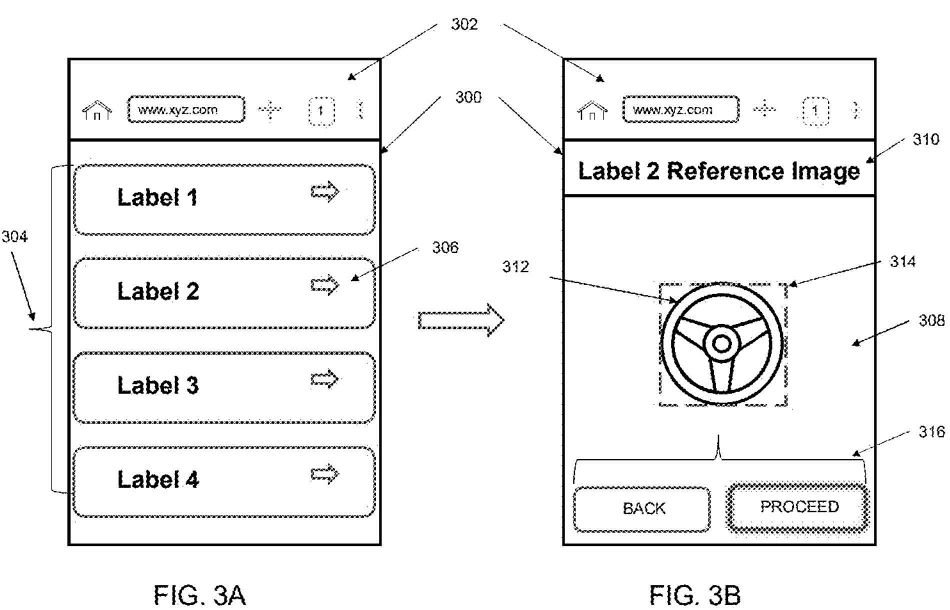
FIG. 3A-3F are exemplary diagrams pertaining to screen/display of an application running on an image capture device depicting the various stages of the execution of the method described in FIG. 1, in accordance with an embodiment of the present disclosure.

FIG. 3A-3F are exemplary diagrams pertaining to screen/display of an application running on an image capture device depicting the various stages of the execution of the method described in FIG. 1., in accordance with an embodiment of the present disclosure. With reference to FIG. 3A, a user interface display/screen 302 of an image capture device 300 is shown. Once the application is initiated on the image capture device, a display/screen is provided on the interface of the image capture device comprising a label or set of labels 304. Once a label/class is selected from the label or set of labels 304, which is shown as a highlighted arrow 306, the user interface display screen is changed to depict a new interface screen/display 308 as depicted in FIG. 3B. At the top of the screen a portion containing an indication 310 about the selected label/class from the set of labels and whether it is a reference image or live image is displayed. This provides a visual cue to the user as to at which function is currently being executed by the application. As depicted, the current/initial step is that of obtaining/capturing the reference image frame. The new interface screen 308, has on its display an initial image pertaining to the selected label from the set of labels as is established as the reference image frame. In an aspect of the invention, the new interface screen 308 can be referred to as the reference image frame. This image can be acquired from a database used to store images of different labels or can be an image captured by the camera of the image capture device. The part of the new interface screen 308 that displays an initial image 312 of the selected label is associated as an object of interest and acts as a reference data point. The initial display of the image contains an image of the selected label 312, and also visual elements 316, that enable a user to capture/select or proceed to the next steps of executing the method as described in FIG. 1. In other words, the initial display comprises all of the elements as depicted in the new interface screen 308, except for the expected annotation 314 and the highlighting of one of the visual elements 316. It should be noted that even though in the new interface screen 308, one of the visual elements "proceed" is shown to be highlighted, it is not highlighted in the initial display screen.

The user is prompted/guided to annotate the image 312 of the selected label to ascertain an expected annotation 314. As described earlier, the expected annotation acts as a guiding or interacting mechanism that is used by the method to help acquire further training dataset for training the ML model. As depicted the expected annotation is a geometrical shape of a rectangular bounding box. It should however be noted that any geometrical shape of expected annotation can be used to properly annotate the selected label 312 from the reference image, say, a square bounding box or a higher dimension polygonal bounding box. Once the selected label 312 is properly annotated by the expected annotation 314, one of the visual elements "Proceed" is highlighted prompting a user to proceed to the next step. It should be noted here that, the visual elements and its text are just exemplary in nature and other types of visual elements and wording can be used to execute the steps of the method as described in association with FIG. 1., without deviating from the spirit and scope of the invention, for e.g., the visual element could be a circular element and the wording can be "click" or "next" instead of "proceed". A pre-defined quantity target is already established for each of the labels, and once the user clicks on proceed visual element 316, thereby establishing expected annotation, both the expected annotation and the pre-defined quantity target is established as seed data for the label from the set of labels. Further, the expected annotation dimensions and position are obtained in a two-dimensional co-ordinate system. On the dimension and position of the expected annotation are obtained, the dimension of the expected annotation is scaled using a scaling factor and the scaled annotation bounding box dimension is obtained as the annotation guideline. Once the annotation guideline is obtained it is shifted in position as per the shifting function by varying its position in a two-dimensional co-ordinate system. These functions are performed by the scaling engine (not shown). Details regarding the scaling and shifting functions have been described in detail with reference to FIG. 1 in more detail and is not described here again for brevity. These functions are executed by the methods steps via a processor (not shown) in conjunction with a scaling engine, in the background oblivious to the user, who just visualizes the display screen.

Figures 3C, 3D:
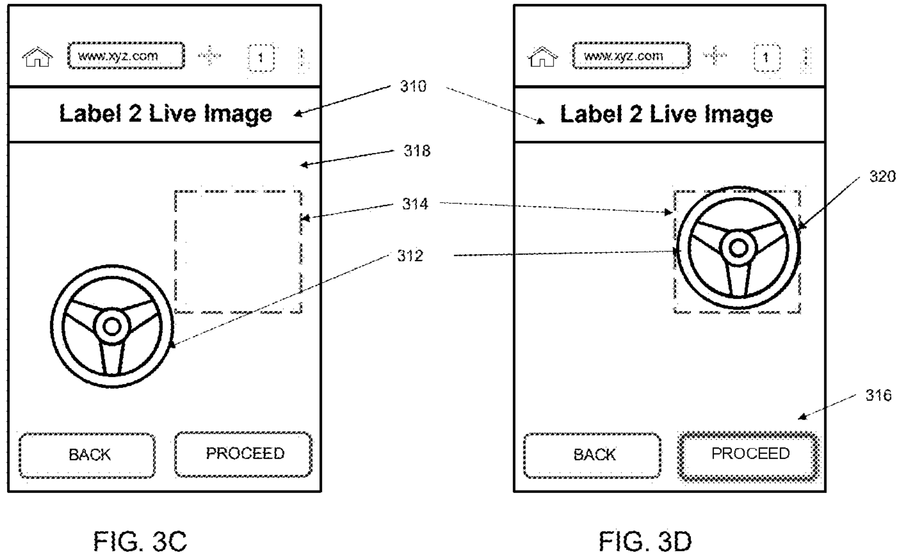
Figures 3E, 3F:
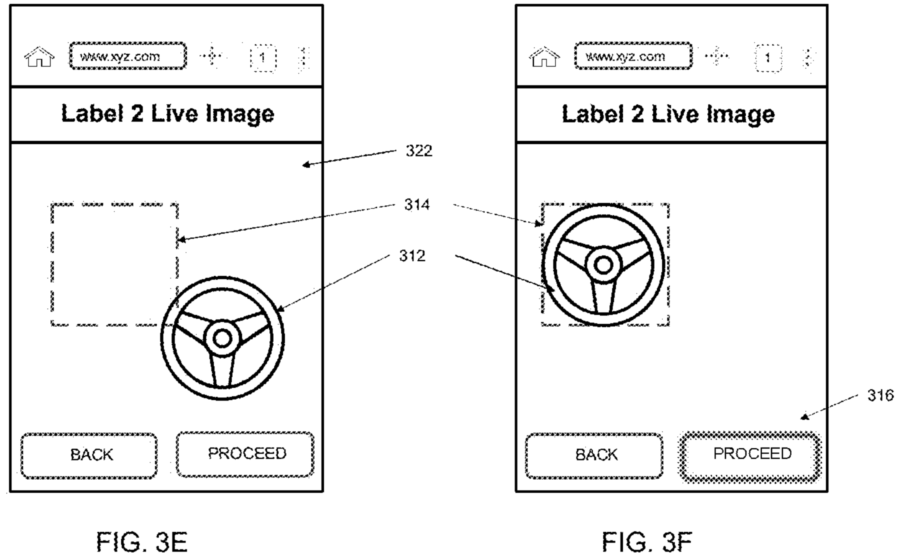

Once the user proceeds by clicking on the visual element 316 and the seed data is established, the image capture device simultaneously displays the initial subsequent screen 318 as depicted in FIG. 3C. It should be noted that all visual elements 316, is displayed as unhighlighted signifying it is the initial display screen pertinent to the next step. The initial subsequent screen 318, comprises the live image 312 of the selected label from the set of labels. It should be noted that, the position of the live image 312 of the selected label from the set of labels is different from the position as displayed in FIG. 3B. This variation in position is because of various factors including but not limited to, the distance of the camera with respect to the live image 312 of the selected label from the set of labels, change in camera angle etc. Further, it should also be noted that, the annotation guideline 314 is displayed on the initial subsequent screen 318, however, it is within the perimeter of the current focus and distance of the camera of the image capture device with respect to the live image object 312 of the selected label from the set of labels. The user is then prompted to adjust the position of the live image frame such that the annotation guideline fully encompasses the object of interest in the live image 312 of the selected label from the set of labels. The prompting can be performed by various means, for example, when the annotation guideline 314 completely encompasses the object of interest, a textual or visual prompt can be provided on the display screen informing the user that an image can be captured. Exemplary visual prompting can be like highlighting the live image 312 of the selected label from the set of labels, highlighting a visual element 316 (button/interface) etc. FIG. 3D depicts such a screen, when the annotation guideline 314 has fully encompassed the live image 312 of the selected label from the set of labels. This is depicted by an indication, as example, by the highlighting on one of the visual elements 316 in the final subsequent screen 320.

Once the user clicks on the highlighted visual element 316, "proceed" a second live image is captured. The second live image frame contains the image of the selected label that has been associated as object of interest and is encompassed by the annotation guideline. The second live image frame is then compared with the reference image frame and a similarity score is determined. This step is also known as benchmarking of the second live image frame. Once the second live image frame is captured, the object of interest is checked for similarity with the reference image frame. The object of interest comprises the entire image frame in the case of training a model for image classification. In the cases involving object detection, the object of interest in the second live image frame encompassed by the annotation guideline bounding box is provided to a detection engine (not shown) that runs a series of checks. The detection engine runs well known techniques used in blur detection, noise/grain detection and improper framing by calculating the similarity between the reference image frame and the second live image frame. It should be noted that thresholds used to detect the amount of blur, noise/grain and framing issues can vary depending on the system and the environment in which the images are being captured. A default value is set as threshold for each of the blur, noise/grain and framing comparison, for example a default value for blur detection can be set to high, unless otherwise configured to fine tune for a specific use case. Further, for noise/grain detection default value can be set to a midway value, unless otherwise configured to fine tune for the specific use case. It should be noted that, the default value is configurable to be set depending on a specific use case, and can be set to a high, medium or low value depending on the other factors such as environmental factors, like images acquired in a moving vehicle as compared to a stationary vehicle/reference, images acquired in bright sunshine, images acquired on a rainy day etc. It should be noted that these steps are executed by the detection engine (not shown) in the background oblivious to the user. In the real world, a user is not required to know how the benchmarking is done using the similarity scores. The benchmarking is only for internal calculations and decision making. For an end user, they would only be interested to know, for example, if the second live image captured is blurry, without having to worry about the evaluation methods and the specific scores that the system has benchmarked for the collected data. For an end user, there is very little value in knowing if the second live image captured has been provided with a similarity score as 0.3 or 0.5 or some other value but would rather be interested in only knowing if the second live image has been accepted or rejected, without worrying about the threshold values. The benchmarking and similarity score are concepts which are used by the method of the disclosure so as to quantise the quality of the live image frame and classify them as accepted or rejected image frames, so as to enable curate and collect improved training dataset for training a ML model.

The accepted second live image frames are stored in a storage unit to be later used to train the ML model and the textual pre-defined quantity target is incremented. Further reiterating, all these above functions are performed in the background by a processor associated with the detection engine oblivious to the user, who just visualizes the display screen. Once the second live image is accepted and stored in a storage unit, the method proceeds to display an initial fresh live image screen 322, as depicted in the FIG. 3E. It should be noted that, the fresh image screen is displayed parallelly on the screen/display of the image capture device, while the analysis of the second live image screen is performed in the background by the processor in conjunction with the detection engine. The initial fresh live image screen 322 displays the annotation guideline now shifted to a different position than that displayed on the new subsequent display screen 318 depicted in FIG. 3C. Also, the live image 312 of the selected label from the set of labels is displayed at a position within the perimeter of the focus of the image capture device, based on the current distance of the camera of the image capture device. The user is then prompted to adjust the frame of the live image such that the annotation guideline fully encompasses the object of interest in the live image 312 of the selected label from the set of labels. As described earlier there are various mechanisms by which a user can be prompted.

Once the user selects the highlighted prompt in the initial fresh live image screen 322, a subsequent live image frame is captured and sent for analysis by the detection engine. The steps of displaying the shifted annotation guideline, varying the position, based on distance and focus of the camera of the image capture device with respect to the object of interest in subsequent live image frames and prompting the user is repeated until the textual pre-defined criteria for the selected label from the set of labels is satisfied. As described earlier the textual pre-defined quantity target criteria is a number that is dependent on the number of classes/labels.

An advantage of the methods described in the disclosure is that due to real-time benchmarking of the training dataset as accepted or rejected in the interactive/guided data collection process, the accepted annotated data minimizes the deviation from the reference data (textual or image), which greatly helps the model being trained to converge faster. Further, due to this guided workflow the overhead of manual annotation of data is greatly reduced. A further advantage of the disclosure is that the method/workflow can be used in developing any machine learning development model/product/service which prioritizes reduced turnaround times and improved quality of models.

Figure 4:
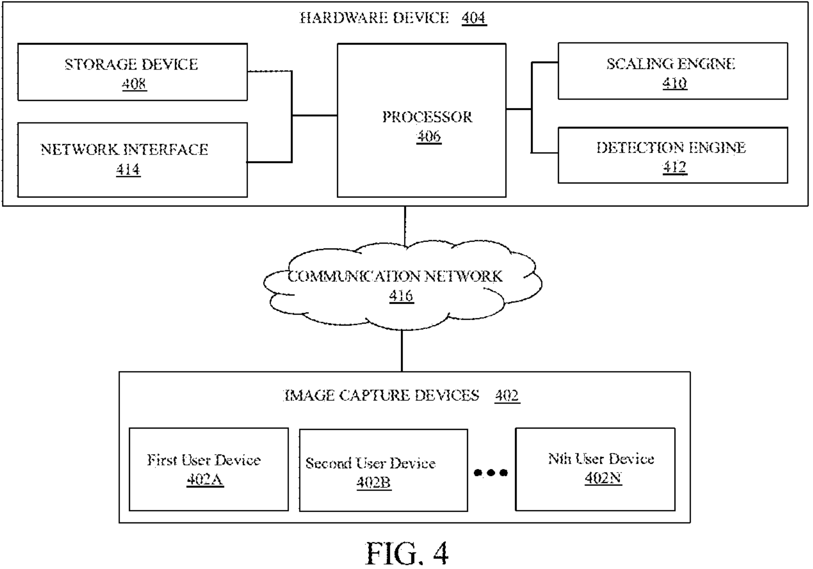
FIG. 4 is a block diagram of a system for improved collection and annotation of datasets used to train a machine learning model, in accordance with an embodiment of the present disclosure.

FIG. 4 is a block diagram of a system for improved collection and annotation of datasets used to train a machine learning model, in accordance with an embodiment of the present disclosure. With reference to FIG. 4, there is shown a system 400 for improved collection and annotation of datasets used to train a machine learning model. The system includes one or more image capture devices 402A to 402N, a hardware device 404 comprising a processor 406, a storage device 408, a scaling engine 410, a detection engine 412, a network interface component 414 in communication with a communication network 416.

The hardware device 404, includes suitable logic, circuitry, interfaces, and code that may be configured to communicate with the plurality of image capture devices 402A to 402N via the communication network 416. Examples of the hardware device 404 may include, but are not limited to a cloud server, an application server, a data server, or an electronic data processing device.

The processor 406 refers to a computational element that is operable to respond to and process instructions that drive the system 400. The hardware processor 406 may refer to one or more individual processors, processing devices, and various elements associated with a processing device that may be shared by other processing devices. Additionally, the one or more individual processors, processing devices, and elements are arranged in various architectures for responding to and processing the instructions that drive the system 400. In some implementations, the hardware processor 406 may be an independent unit and may be located outside the hardware device 404 of the system 400. Examples of the hardware processor 406 may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry or a processor forwarding system.

The storage device 408 is configured to store the instructions executable by the hardware processor 406. Examples of implementation of the memory 408 may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The communication network 416 includes a medium (e.g., a communication channel) through which multiple image capture devices 402A to 402N communicate with the hardware device 404. The communication network 416 may be a wired or wireless communication network. Examples of the communication network 416 may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

The network interface 414 refers to a communication interface to enable communication of the hardware device 404 to any other external device, such as the plurality of image capture user devices 402A to 402N. Examples of the network interface 414 include but are not limited to, a network interface card, a transceiver, and the like.

The scaling engine 410 and the detection engine 412, refers to a computational element that is operable to respond to and process instructions that drive the system 400. The scaling engine includes suitable logic, circuitry, interfaces, and code that may be configured to be executed by the processor to execute fully or part of the method steps as described in conjunction with FIG. 1 and FIG. 2.

The plurality of image capture user devices 402A to 402N refers to an electronic computing device operated by a user. The plurality of user devices 402A to 402N may be configured to send and receive data and or instruction to the hardware device 404. Examples of the plurality of image capture user devices 402 may include but are not limited to a mobile device, a smartphone, a desktop computer, a laptop computer, a Chromebook, a tablet computer, a robotic device, a digital camera or other user devices. In an implementation, the processor 406 and the storage device 408 may be implemented on the same hardware device, such as the hardware device 104.

In some implementations, the system 400 further includes the data storage that is communicatively coupled with the hardware device 404 via the communication network 416. In an implementation, the image capture devices 402A to 402N are utilized to capture images of objects of interest as a reference image and send the same to the hardware device 404 via the communication network 416. The hardware device that analyses the image provides further instructions to one or more of the plurality of image capture devices 402A to 402N. The hardware device 404 is responsible for executing all the functions described as being performed in the background oblivious to the user with respect to FIG. 1, FIG. 2 and FIG. 3. The hardware device has all the instructions stored in the storage device 408, pertaining to the execution of the application and the method steps as described in conjunction with FIG. 1, FIG. 2 and FIG. 3.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

I claim:

1. A method for curation of training data for training machine learning models comprising:

capturing, using an image capture device, a reference image frame comprising an object of interest;

obtaining a reference datapoint for a label or a set of labels from the reference image frame; wherein the label or set of labels is associated with the object of interest;

annotating the reference datapoint to ascertain an expected annotation for each label or the set of labels; wherein the expected annotation comprises a geometrical shape;

establishing the expected annotations and a pre-defined quantity target as seed data for each label or the set of labels;

scaling the geometrical shape of the expected annotation based on a predetermined scaling factor;

obtaining a position of the scaled geometric shape as an annotation guideline;

shifting the position of the annotation guideline by varying the position in a two-dimensional coordinate system and displaying the shifted annotation guideline and a live image on the screen of the image capture device; wherein the live image comprises an image including the object of interest;

prompting a user to adjust the live image frame such that the object of interest is tightly encompassed inside the scaled and shifted annotation guideline displayed on the live image screen;

capturing a second live image frame and comparing the objects of interest in the captured second live image frame with the objects of interest in the reference image frame to determine a similarity score;

classifying, in real-time, the captured second live image frame as accepted, if the similarity score is above a pre-defined threshold;

storing the accepted image frames as training dataset for machine learning models; and repeating, for newly captured live image frame, the steps of shifting, prompting, capturing, classifying and storing until the pre-defined quantity target criteria is satisfied, based on a comparison between the newly captured live image frame and the reference image frame.

2. The method of claim 1, wherein the geometrical shape comprises a rectangular bounding box, a square bounding box or a higher dimension polygonal bounding box.

3. The method of claim 1, wherein the reference image frame comprises one or more objects.

4. The method of claim 3, wherein each of the one or more objects is associated with a label from the set of labels.

5. The method of claim 1, wherein the pre-defined quantity target is a threshold number of captured image frames classified as accepted for each of the labels or the set of labels.

6. The method of claim 1, wherein predetermined scaling factor is a value by which the size of the geometrical shape of the expected annotation is scaled-up and/or scaled-down to obtain the size of the annotation guideline.

7. The method of claim 1, wherein shifting the position of annotation guideline comprises changing the two-dimensional co-ordinates of the annotation guideline using a shifting formula.

8. The method of claim 1, wherein prompting the user comprises providing a visual or textual indication.

9. The method of claim 8, wherein prompting the user further comprises checking for motion or blur, improper framing of the live image screen.

10. The method of claim 1, wherein similarity score is determined based on one or more of a blur detection, a noise detection, an improper framing detection and environmental conditions.

11. The method of claim 10, wherein classifying in real-time the captured images comprises, comparing the similarity score of the captured images to one or more of a benchmark criteria.

12. The method of claim 11, wherein the benchmark criteria is associated with a label or set of labels.

13. The method of claim 1, wherein the training dataset comprises audio dataset, image dataset, video dataset and/or textual dataset.

14. The method of claim 13, further comprising: obtaining a reference textual dataset pertaining to a textual object of interest and associating with a textual pre-defined quantity target; wherein the reference textual dataset comprises questions/phrases related to an object of interest; and wherein the object of interest comprises masking words representative of the reference textual dataset;

guiding a user to associate variations of the questions/phrases with the reference textual dataset and determining a textual similarity score; wherein the variations of the questions/phrases comprises grammatical variations, active/passive voice variations and/or contextual variations;

classifying in real time, the variations of the questions/phrases as accepted, if the similarity score is below a second pre-defined threshold;

storing the accepted variations of the questions/phrases as training dataset for training a machine learning model; and repeating the steps of guiding, classifying and storing until the textual pre-defined quantity target criteria is satisfied.

15. An image curation system for curation of training dataset for training machine learning models comprises:

an image capture device configured to capture images of a scene;

a hardware device comprising one or more storage devices and one or more processing units;

wherein the storage device comprises instructions stored therein that when executed by the one or more processing unit causes the image curation system to:

obtain a reference image frame comprising an object of interest captured using the image capture device;

obtain a reference datapoint for a label or a set of labels from the reference image; wherein the label or set of labels is associated with the object of interest;

annotate the reference datapoint to ascertain an expected annotation for each label or a set of labels; wherein the expected annotation comprises a geometrical shape;

establish the expected annotations and a pre-defined quantity target as seed data for each label or the set of labels;

scale the geometrical shape of the expected annotation based on a predetermined scaling factor;

obtain a position of the scaled geometric shape as an annotation guideline;

shift the position of the annotation guideline by varying the position in a two-dimensional coordinate system and displaying the shifted annotation guideline and a live image on the screen of the image capture device; wherein the live image comprises an image including the object of interest; prompt a user to adjust the live image frame such that the object of interest is tightly encompassed inside the scaled and shifted annotation guideline displayed on the live image screen;

capture a second live image frame and compare the captured second live image frame with the reference image frame to determine a similarity score;

classify, in real time, the captured second live image frame as accepted, if the similarity score is above a pre-defined threshold; store the accepted image frames in the one or more storage device as training dataset for machine learning models;

repeat, for newly captured live image frame, the shift, prompt, capture, classify and store functions until a pre-defined quantity target is satisfied, based on a comparison between the newly captured live image frame and the reference image frame.

16. The system of claim 15, wherein comparing the captured second live image frame further comprises comparing the object of interest in the reference frame and captured second live image frame.

17. The system of claim 15, wherein the training dataset further comprises audio dataset, image dataset, video dataset and/or textual dataset.

18. The system of claim 15, wherein the storage device comprises further instructions causing the image curation system to:

obtain a reference textual dataset pertaining to a textual object of interest and associating with a textual pre-defined quantity target; wherein the reference textual dataset comprises questions/phrases pertaining to an object of interest;

guide a user to associate variations of the questions/phrases with the reference textual dataset and determining a textual similarity score; wherein the variations of the questions/phrases comprises grammatical variations, active/passive voice variations and/or contextual variations;

classify in real time, the variations of the questions/phrases as accepted, if the textual similarity score is below a second pre-defined threshold;

store the accepted variations of the questions/phrases as training dataset for training a machine learning model; and repeat the guide, classify, and store functions until the textual pre-defined quantity target criteria is satisfied.

* * * * *